(12) United States Patent
Angara et al.

(10) Patent No.: US 9,576,348 B2
(45) Date of Patent: Feb. 21, 2017

(54) FACILITATING TEXT IDENTIFICATION AND EDITING IN IMAGES

(71) Applicant: Adobe Systems Incorporated, San Jose, CA (US)

(72) Inventors: Srinivasa Madhava Phaneendra Angara, Noida (IN); Ajay Bedi, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 110 days.

(21) Appl. No.: 14/542,085

(22) Filed: Nov. 14, 2014

(65) Prior Publication Data

US 2016/0140701 A1 May 19, 2016

(51) Int. Cl.
*G06T 5/00* (2006.01)
*G06T 11/60* (2006.01)
*G06K 9/46* (2006.01)
*G06K 9/62* (2006.01)
*G06T 3/00* (2006.01)

(52) U.S. Cl.
CPC ............... *G06T 5/006* (2013.01); *G06K 9/46* (2013.01); *G06K 9/6215* (2013.01); *G06K 9/6267* (2013.01); *G06T 3/00* (2013.01); *G06T 11/60* (2013.01); *G06K 2009/4666* (2013.01)

(58) Field of Classification Search
CPC ............. G09G 5/24; G09G 5/28; G09G 5/26; G06K 2215/0057; G06T 11/60
See application file for complete search history.

(56) References Cited

U.S. PATENT DOCUMENTS

| | | | | |
|---|---|---|---|---|
| 6,989,822 B2* | 1/2006 | Pettiross | ............... | G06F 3/0236 345/169 |
| 7,630,581 B2* | 12/2009 | Kojima | ............... | G06K 9/3283 382/290 |
| 7,945,101 B2* | 5/2011 | Chen | ............... | G06K 9/6234 382/190 |
| 8,509,536 B2* | 8/2013 | Hwang | ............... | G06K 9/00463 382/176 |
| 2004/0155965 A1* | 8/2004 | Jaynes | ............... | H04N 5/74 348/189 |

* cited by examiner

*Primary Examiner* — Antonio A Caschera
(74) *Attorney, Agent, or Firm* — Wolfe-SBMC

(57) ABSTRACT

Facilitating text identification and editing in images in which in one or more embodiments, a user selection of a location in an area of text in an image is received. Given the location, a region of interest that includes text (including the location of the user selection) in the image is determined. Distortion resulting from a surface in the image on which the text is situated being at some angle other than parallel to the image capture plane is also corrected. One or more fonts and font sizes of the text in the region of interest are also detected. Various actions can be taken on the text in the region of interest (e.g., editing the text and/or identifying the text).

20 Claims, 10 Drawing Sheets

FACILITATING TEXT IDENTIFICATION AND EDITING IN IMAGES

BACKGROUND

Images, such as photographs, having text embedded therein are commonplace. These images represent scenes in which the text is oftentimes inherent, such as writing on a board or sign. Situations arise in which users desire to have this text recognized and used in some manner by a computer. However, because the text is inherent in the scene, there is typically no metadata or other information accompanying the image that describes the text. This lack of information describing the text can make it difficult for the computer to recognize and use the text, hampering the experience of the user when using the computer.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Facilitating text identification and editing in images is described herein.

In one or more embodiments, a region of interest in an image that includes text is identified and a transformation matrix to correct distortion of the region of interest in the image is determined. Pixels in the region of interest are transformed to a substantially rectangular region, and characters of the text are recognized from the substantially rectangular region.

In one or more embodiments, a region of interest in an image that includes text is identified, and a font classifier trained on multiple fonts is accessed. One of the multiple fonts used for a character of the text is detected by the font classifier, and an optical character recognizer is used to recognize the character based on the detected font.

In one or more embodiments, a computing device comprises a processing system including one or more processors, and one or more computer-readable storage media having stored thereon multiple instructions that, when executed by the processing system, cause the processing system to perform acts. The acts comprise identifying a region of interest in an image that includes text, correcting distortion in the region of interest, receiving edit inputs for the text, and editing the text based on the received edit inputs.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
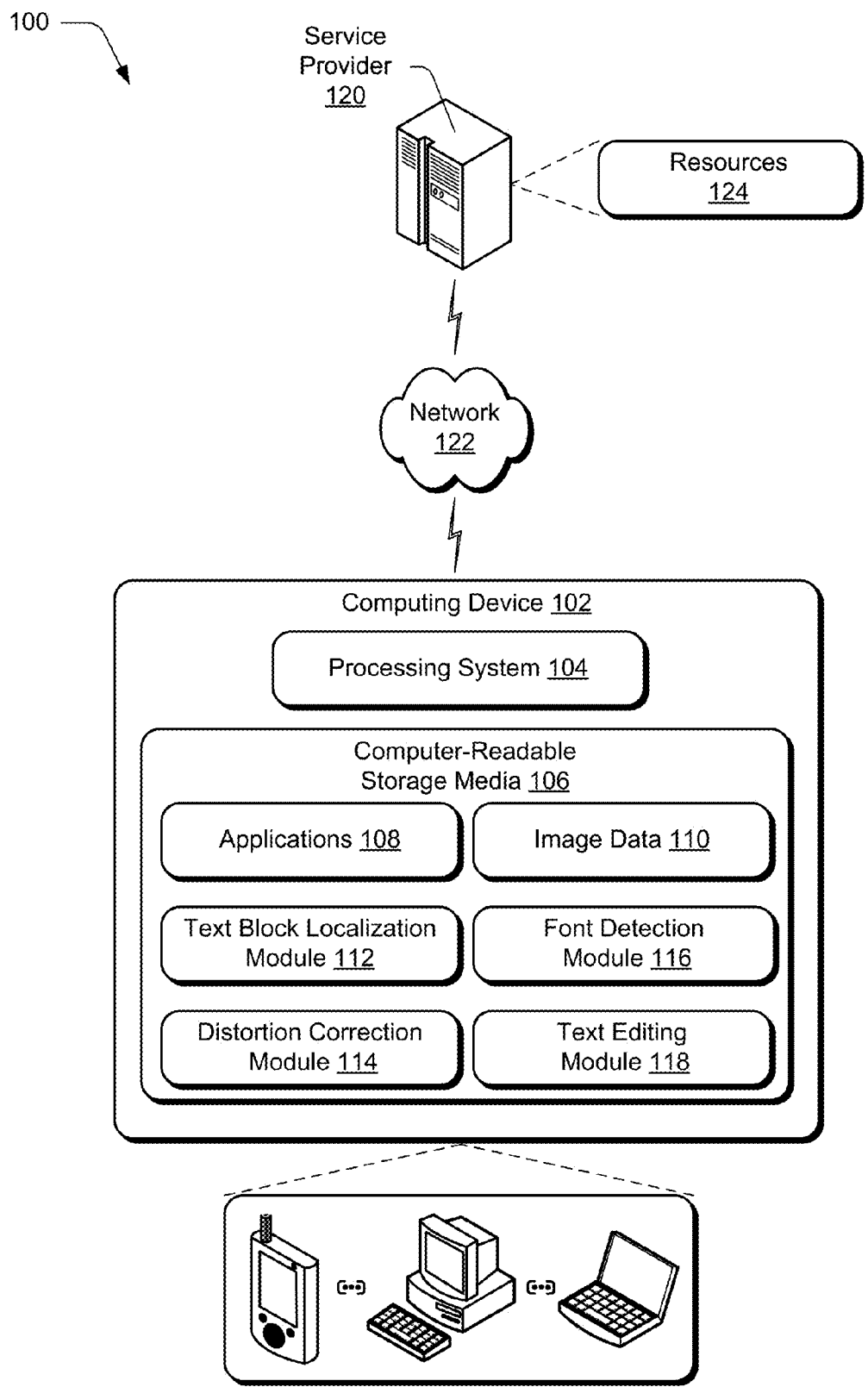
FIG. 1 is an illustration of an environment in an example embodiment that is operable to employ techniques described herein.

Facilitating text identification and editing in images is described herein. In one or more embodiments, a user selection of a location in an area of text in an image is received. Given the location, a region of interest in the image is determined. The region of interest refers to a region of the image that includes text (including the location of the user selection). The region of interest is determined by applying thresholding to a reduced noise version of the image, resulting in a thresholded version of the image, and expanding the boundaries of characters in the thresholded version of the image using a dilation operator. A test region is expanded outward from the location of the user selection until no dilated block is within a threshold number of pixels beyond the test region, at which point the test region is the region of interest.

Distortion in the region of interest is also corrected. Distortion of the region of interest refers to the surface in the image on which the text is situated (and thus the region of interest) being at some non-zero angle relative to an image capture plane that captured the image rather than being parallel to the image capture plane. Distortion in the region of interest is corrected by identifying the coordinates of the region of interest, identifying coordinates of a substantially rectangular region, and generating a homography allowing the non-rectangular region of interest to be translated into the rectangular region.

One or more fonts and font sizes of the text in the region of interest are also detected. The font sizes are detected based on (e.g., by averaging) the character height of all of the individual characters in the distortion corrected image. The fonts are detected using linear discriminant analysis to identify a font that is closest to a supported font.

In one or more embodiments, the text in the region of interest is edited. Various different user inputs can be received to change the text in the region of interest, and these changes are reflected in the image. For example, some original text in the region of interest can be deleted and replaced with new text having the same (or similar) font as the original text, and the new text being distorted so that the new text in the region of interest has the same distortion as the original text had.

In one or more embodiments, actions are taken based on the identified text without editing the text in the region of interest. For example, optical character recognition that is based on the detected fonts of the text in the region of interest can be performed. The optical character recognition can be more accurate due to the distortion having been corrected and the fonts having been detected.

The techniques discussed herein support a variety of different usage scenarios. For example, computer products or services can be offered that allow the characters in an image (e.g., the wording on a sign or billboard in the image, the characters on a building in the image, a license plate on a car in the image, etc.) to be recognized. By way of another example, computer products or services can be offered that allow the original characters in the image to be replaced in a manner that results in the characters looking the same as or similar to the original characters in the image (e.g., allowing the user to change the wording on a sign or billboard in an image, allowing a user to change the characters on a building in the image, allowing the user to change the wording on a hat or other clothing in the image, etc.). These products or services can be provided in various forms, such as one or more plugins, one or more applications, one or more hosted services, and so forth.

Example Environment

FIG. 1 is an illustration of an environment 100 in an example embodiment that is operable to employ techniques described herein. The illustrated environment 100 includes a computing device 102 having a processing system 104 that can include one or more processing devices (e.g., processors) and one or more computer-readable storage media 106. The illustrated environment 100 also includes applications 108, image data 110, a text block localization module 112, a distortion correction module 114, a font detection module 116, and a text editing module 118 embodied on the computer-readable storage media 106 and operable via the processing system 104 to implement corresponding functionality described herein. In one or more embodiments, the computing device 102 also includes functionality to capture images or otherwise obtain images (e.g., via communication with a camera or other image capture device, by accessing web-based resources (e.g., content and services), and so forth).

The computing device 102 may be configured as any suitable type of computing device. For example, the computing device 102 may be configured as a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., personal computers, game consoles) to low-resource devices with limited memory and/or processing resources (e.g., mobile devices). Additionally, although a single computing device 102 is shown, the computing device 102 may be representative of a plurality of different devices to perform operations "over the cloud" as further described in relation to FIG. 12.

The environment 100 further depicts one or more service providers 120, configured to communicate with computing device 102 over a network 122, such as the Internet, to provide a "cloud-based" computing environment. Generally speaking, a service provider 120 is configured to make various resources 124 available over the network 122 to clients. In some scenarios, users may sign up for accounts that are employed to access corresponding resources from a provider. The provider may authenticate credentials of a user (e.g., username and password) before granting access to an account and corresponding resources 124. Other resources 124 may be made freely available, (e.g., without authentication or account-based access). The resources 124 can include any suitable combination of services and/or content typically made available over a network by one or more providers. Some examples of services include, but are not limited to, photo editing services, image illustrating services, photo printing services (e.g., Snapfish®, Shutterfly®, and the like), photo storage and/or sharing services (e.g., Flickr®), social network services (e.g., Facebook®, Twitter®, Instagram®, and the like), and so forth.

These sources may serve as significant amounts of image content. Image data 110 may represent such image content, which may be formatted in any of a variety of image formats, including but not limited to JPEG, TIFF, RAW, GIF, BMP, PNG, and so on. The image content made available through the services may be posted by users that have accounts with those services. For example, a user having an account with a photo storage and/or sharing service may upload images, such as those taken with a digital camera of the user, or those sent to the user via electronic means. A user of the photo storage and/or sharing service may then share their uploaded images with others, such as by providing a link to photo albums or to a profile of the user.

The text block localization module 112 represents functionality to determine a region of the image that includes text, also referred to herein as a region of interest. This region of interest allows one or more regions of the image that include text to be identified and further analyzed or acted upon (e.g., to perform optical character recognition (OCR)).

The distortion correction module 114 represents functionality to correct distortion in the region of interest. Images are oftentimes captured so that the surface in the image on which the text is situated is not parallel to an image capture plane, resulting in the region of interest being at some particular angle relative to the image capture plane. The distortion correction module 114 generates a homography to correct for this distortion.

The font detection module 116 represents functionality to detect one or more fonts of the text in the region of interest. One or more fonts that are the same as, or similar to, the font of the text in the region of interest are identified.

The text editing module 118 represents functionality to edit text in the region of interest. This editing can be deleting text, adding text, replacing text, combinations thereof, and so forth. The text editing module 118 can use a content aware fill process to remove at least some of the text in the region of interest, and can replace the text in the region of interest with other text (e.g., provided by the user). This replacement text is in the same font as the text that is replaced (the font being determined by the font detection module 116), and a distortion is introduced to the replacement text based on the homography determined by the distortion correction module 114.

One or more of the text block localization module 112, the distortion correction module 114, the font detection module 116, and the text editing module 118 can be implemented as a software or firmware module. Alternatively, although illustrated as being included on computer-readable storage media 106, one or more of the text block localization module 112, the distortion correction module 114, the font detection module 116, and the text editing module 118 can be implemented as a hardware device, or using a combination of software, hardware, firmware, fixed logic circuitry, etc. Further, one or more of the text block localization module 112, the distortion correction module 114, the font detection module 116, and the text editing module 118 can be implemented as a standalone component of the computing device 102 as illustrated. Additionally or alternatively, one or more of the text block localization module 112, the distortion correction module 114, the font detection module 116, and the text editing module 118 can be configured as a component of an application 108, an operating system of the computing device 102, a plug-in module, a standalone service or a service integrated with other services, or other device application.

Although particular functionality is discussed herein with reference to particular modules, it should be noted that the functionality of individual modules discussed herein can be separated into multiple modules, and/or at least some functionality of multiple modules can be combined into a single module. Additionally or alternatively, it should be noted that the computing device 102 need not include all of the modules 112, 114, 116, and 118 in one or more embodiments. For example, the computing device 102 may include text block localization module 112, distortion correction module 114, and font detection module 116, but not text editing module 118.

Additionally, various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Having considered an example environment, consider now a discussion of some example details of the techniques for facilitating text identification and editing in images in accordance with one or more embodiments. In the following discussion, text localization, distortion correction, font detection, and text replacement are discussed.

Text Localization

The text block localization module 112 represents functionality to determine a region of the image that includes text, also referred to herein as a region of interest. This region of interest allows one or more regions of the image that include text to be identified and further analyzed or acted upon. A region of interest can be further analyzed or acted upon in different manners, such as analyzed to identify the text included in the region of interest (e.g., performing OCR), analyzed to identify the font of the text in the region of interest, and so forth.

Figure 2:
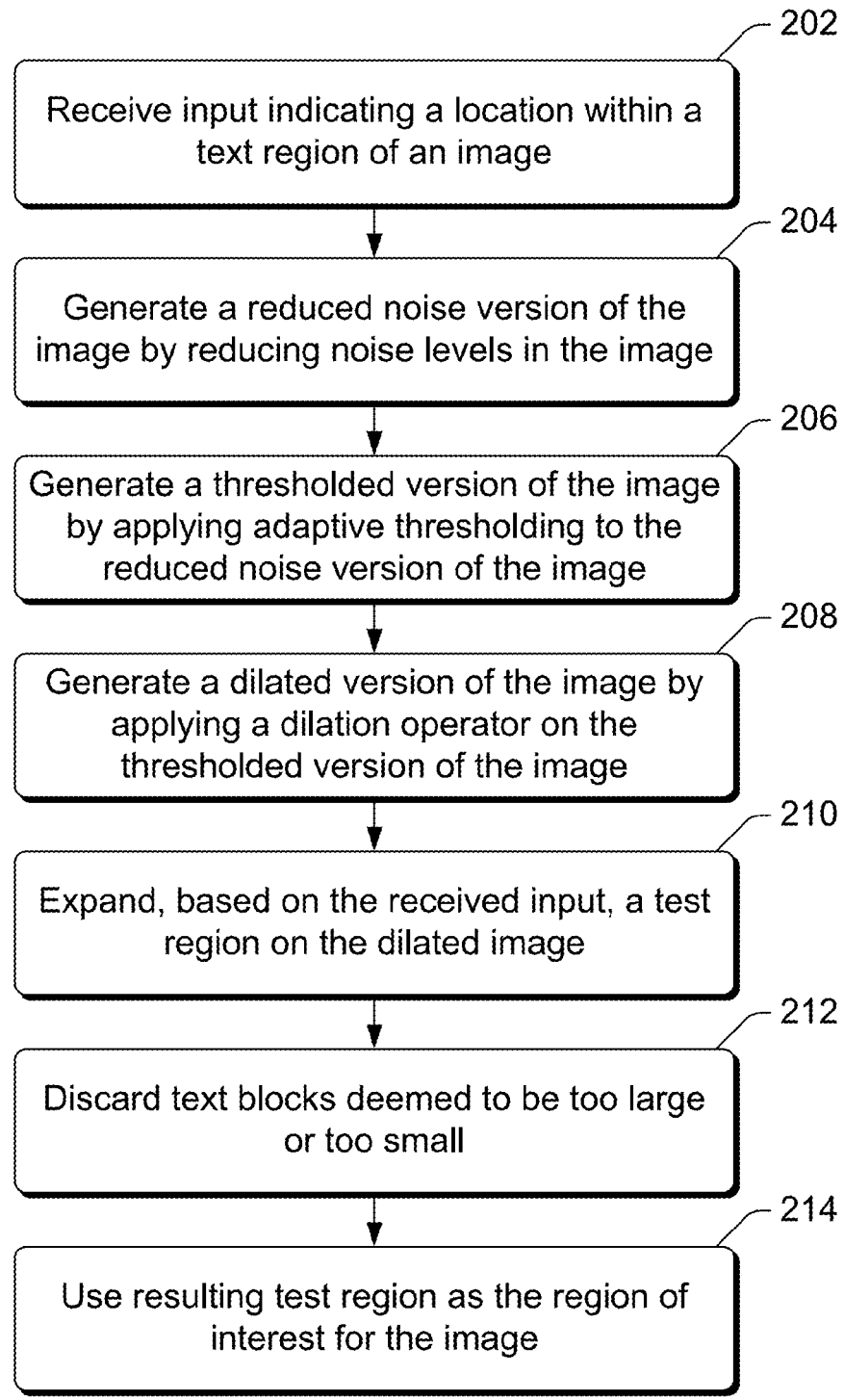
FIG. 2 is a flowchart illustrating an example process for performing text localization in accordance with one or more embodiments.

FIG. 2 is a flowchart illustrating an example process 200 for performing text localization in accordance with one or more embodiments. Process 200 is carried out by a text block localization module of a device, such as the text block localization module 112 of FIG. 1, and can be implemented in software, firmware, hardware, or combinations thereof. Process 200 is shown as a set of acts and is not limited to the order shown for performing the operations of the various acts. Process 200 is an example process for performing text localization; additional discussions of performing text localization are included herein with reference to different figures.

In process 200, an input indicating a location within a text region of an image is received (act 202). The input can be a user input, such as user selection of a location where text is located in the image. Such user input can be received in various manners, such as by a user touching a location of an image displayed on a touch screen, a user maneuvering a pointer or other indicator over a location on the image and actuating a button of a cursor control device (e.g., clicking a mouse button), and so forth. Alternatively, the input can be received from another component, module, device, and so forth.

Figure 3:
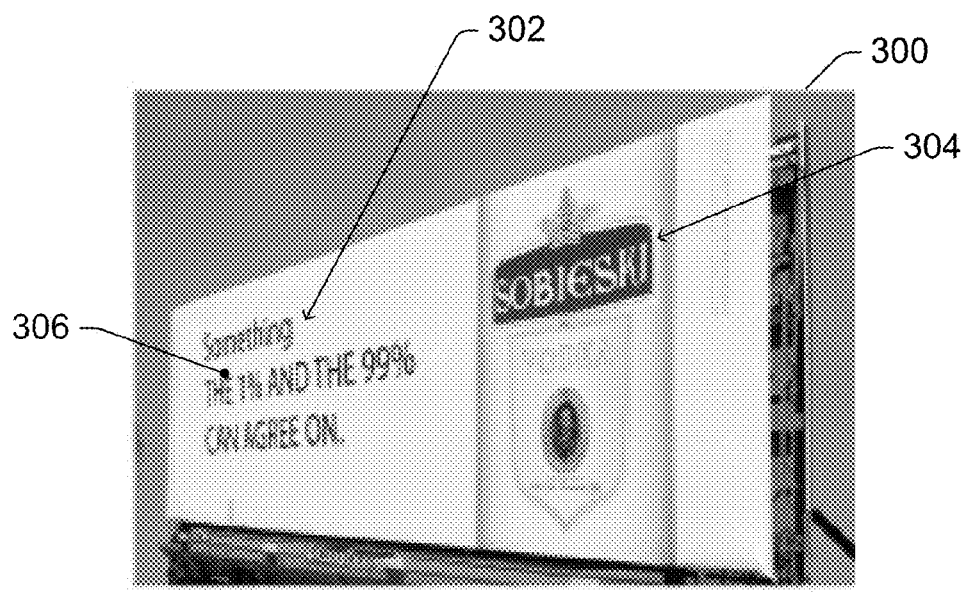
FIGS. 3, 4, 5, and 6 each illustrate example images in accordance with one or more embodiments.

FIG. 3 illustrates an example image 300 in accordance with one or more embodiments. The image 300 can be a color image or a non-color image (e.g., a grayscale image). The image 300 includes multiple text regions, such as text region 302 and text region 304. The input received in act 202 of process 200 can be, for example, an indication of a location 306 in the image 300. It should be noted that the input can indicate anywhere within a text region (e.g., the input need not indicate the center of a text region 302 or 304).

Returning to FIG. 2, a reduced noise version of the image is generated by reducing noise levels in the image (act 204). Noise levels in the image can be reduced using any of a variety of public or proprietary noise reduction techniques. In one or more embodiments, the noise levels are reduced by applying a Gaussian blur to the image (blurring the image using a Gaussian function) one or more times. The Gaussian blur can be applied any number of times (e.g., three times) to the image.

A thresholded version of the image is generated by applying adaptive thresholding to the reduced noise version of the image (act 206). Any of a variety of public or proprietary adaptive threshold techniques can be used to generate the threshold version. The adaptive thresholding generates a thresholded version of the image, which is a binary version of the image. In the binary version of the image, each pixel of the image has a value of 0 or 1 (e.g., white or black). Alternatively, rather than using an adaptive thresholding technique, any of a variety of different public or proprietary thresholding techniques (e.g., other than adaptive thresholding techniques) can be used.

In one or more embodiments, the adaptive thresholding is applied in act 206 as follows. For each pixel of the reduced noise version of the image, an n×n (e.g., n=64) block centered around the current pixel is considered. The threshold for this block is calculated to be the average of this n×n pixel intensities. Using this threshold value, the pixel is binarized. This is done for all the pixels, resulting in a binarized image. A copy of the original image is kept so as to not use the binarized values for threshold computation of the subsequent pixels.

Figure 4:
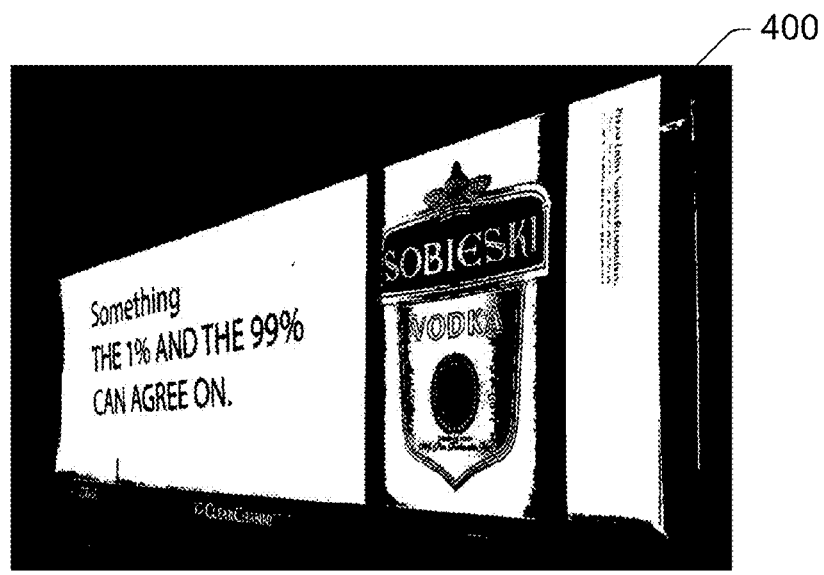

FIG. 4 illustrates an example image 400 in accordance with one or more embodiments. The image 400 is a thresholded version of a reduced noise version of the image 300 of FIG. 3.

Returning to FIG. 2, a dilated version of the image is generated by applying a dilation operator on the thresholded version of the image (act 208). Any of a variety of different public or proprietary dilator operators can be used. The dilation operator expands the boundaries of individual characters in the thresholded version of the image so that the lines of each character of text in the thresholded version of the image become a block, also referred to as a text block. Different ones of these text blocks can run together so that the text blocks from different characters in a line of text cannot be distinguished from one another. The dilation operator is applied one or more times (e.g., five to seven times), being repeatedly applied until lines of text in the thresholded version of the image become a text block.

In one or more embodiments, the dilation operator is applied in act 208 as follows. The dilation operator takes two pieces of data as inputs. The first piece of data is the image which is to be dilated. The second piece of data is a set of coordinate points referred to as a structuring element. To compute the dilation of a binary input image by this structuring element, each of the background pixels in the input image is considered in turn. For each background pixel (referred to as the input pixel) the structuring element is superimposed on top of the input image so that the origin of the structuring element coincides with the input pixel position. If at least one pixel in the structuring element coincides with a foreground pixel in the image underneath, then the input pixel is set to the foreground value. If all the corresponding pixels in the image are background, however, the input pixel is left at the background value. In one or more embodiments, a 3×3 square matrix of all 1's is used as the structuring element. Thus, the set of coordinate points is the following: {(−1, −1), (−1, 0), (−1, 1), (0, −1), (0, 0), (0, 1), (1, −1), (1, 0), (1, 1)}.

Figure 5:
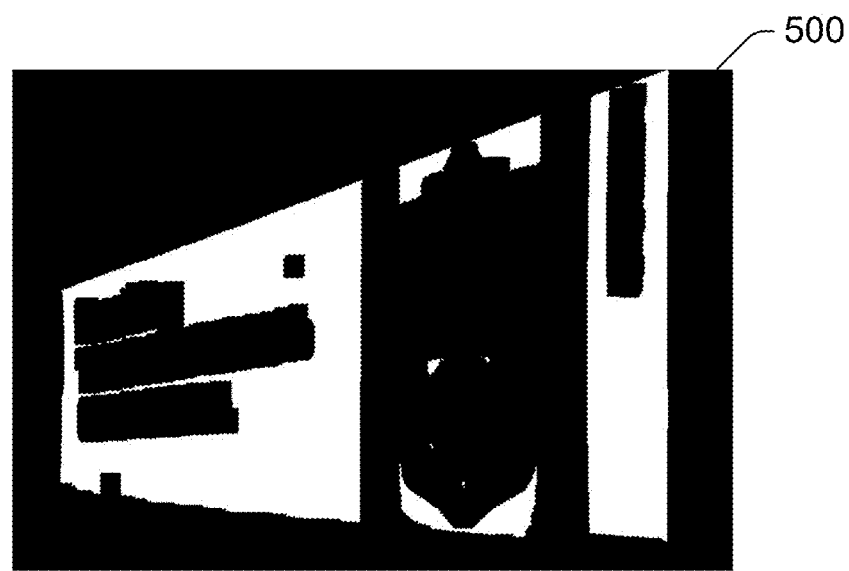

FIG. 5 illustrates an example image 500 in accordance with one or more embodiments. The image 500 is a dilated version of the image 400 of FIG. 4. As can be seen in the images 400 and 500, characters that were discernable and readable in the image 400 have been dilated to text blocks that run together in the image 500.

Returning to FIG. 2, a test region of the dilated image is expanded based on the received input (act 210). The test region starts, for example, as a small quadrilateral region (e.g., a default number of pixels, or the size of a text block in the dilated image that includes the location indicated in act 202). Each edge of the test region is expanded outward (away from the center of the test region) until there is no text block in the dilated image that lies beyond a particular number of pixels of the edge. Different numbers of pixels can be used as this particular number of pixels (e.g., the particular number of pixels can be five to ten pixels).

Figure 6:
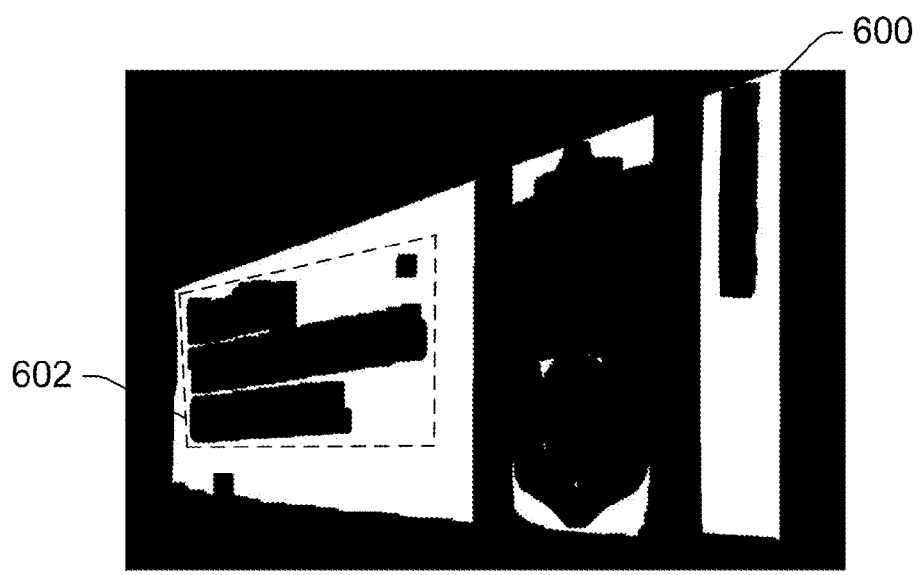

FIG. 6 illustrates an example image 600 in accordance with one or more embodiments. The image 600 is the image 500 of FIG. 5, and the expanded test region generated in act 210 of FIG. 2 is illustrated by dashed line 602. As can be seen in the image 600, the test region generated in act 210 is expanded to surround the text blocks that are in the same area as the input received in act 202 of FIG. 2.

Returning to FIG. 2, text blocks that are deemed to be too large or too small are optionally discarded (act 212). A text block can be discarded in different manners, such as by adjusting the edges of the test region to exclude the text block, creating holes in the test region (a hole being an area that is excluded from the test region), and so forth. In one or more embodiments, the text in a region of interest is assumed to be of approximately the same font size. Thus, if the expanded test region includes one or more text blocks that are deemed to be too large or too small, such text blocks are discarded and excluded from the test region in act 212. A text block is deemed to be too large if the text block is at least a threshold amount larger than other text blocks in the test region (e.g., at least a threshold amount larger than an average or mean size (e.g., area) of the text blocks in the test region). A text block is deemed to be too small if the text block is at least a threshold amount smaller than other text blocks in the test region (e.g., at least a threshold amount smaller than an average or mean size (e.g., area) of the text blocks in the test region).

The resulting test region is used as the region of interest for the image (act 214). This resulting test region is the expanded test region in act 210, modified to discard blocks deemed to be too large or too small in act 212. Thus, for example, the test region 602 of FIG. 6 becomes the region of interest, and the test region 602 can also be referred as the region of interest 602.

Distortion Correction

The distortion correction module 114 of FIG. 1 represents functionality to correct distortion in the region of interest. The region of interest can be at some particular angle relative to the image capture plane. For example, the region of interest 602 of FIG. 1 is illustrated at a non-zero angle relative to the image capture plane, and is illustrated as a non-rectangular shape. This angle results in distortion, which can hamper additional analysis or use of the region of interest (e.g., for OCR). The distortion correction module 114 generates a homography to correct for this distortion, the homography allowing the non-rectangular region of interest to be translated into a rectangular region.

Although discussed herein with reference to being a rectangular region, it should be noted that the rectangular region can be substantially rectangular and need not be exactly in the shape of a rectangle. For example, the region can be a quadrilateral region and the opposite sides of the shape may not be exactly parallel, but are substantially parallel (e.g., within a threshold number of degrees of being parallel, such as one or two degrees).

Figure 7:
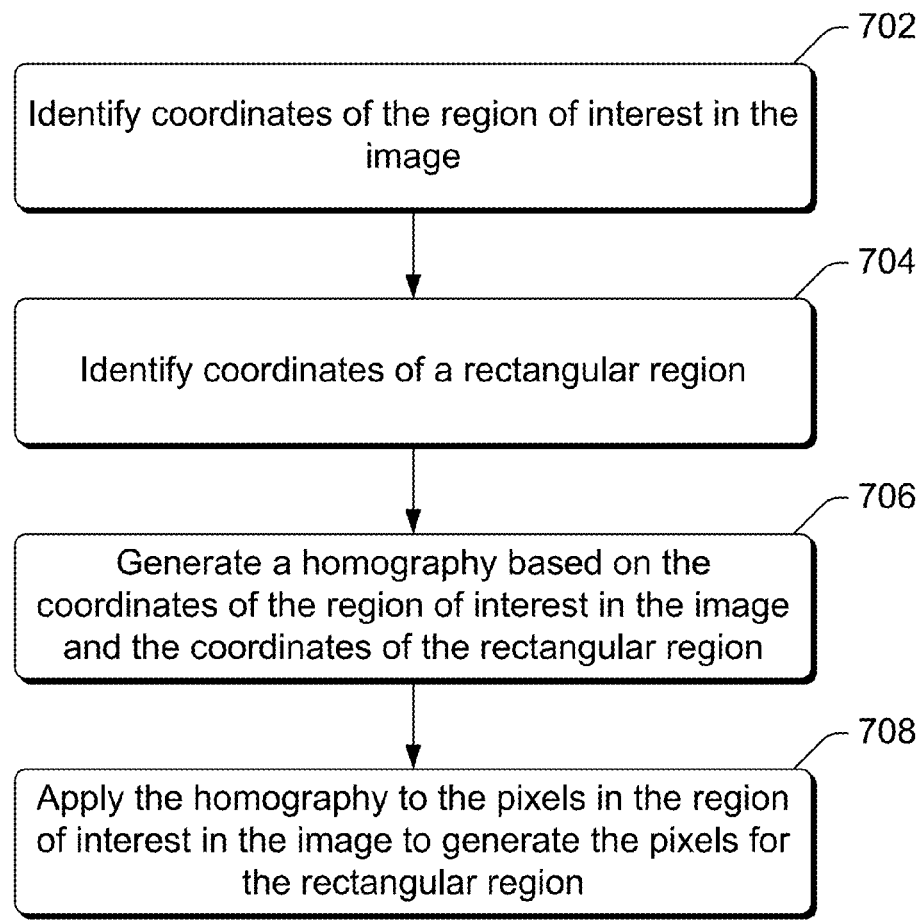
FIG. 7 is a flowchart illustrating an example process for performing distortion correction in accordance with one or more embodiments.

FIG. 7 is a flowchart illustrating an example process 700 for performing distortion correction in accordance with one or more embodiments. Process 700 is carried out by a distortion correction module of a device, such as the distortion correction module 114 of FIG. 1, and can be implemented in software, firmware, hardware, or combinations thereof. Process 700 is shown as a set of acts and is not limited to the order shown for performing the operations of the various acts. Process 700 is an example process for performing distortion correction; additional discussions of performing distortion correction are included herein with reference to different figures.

In process 700, the coordinates of the region of interest in the image (the non-rectangular region of interest) are identified (act 702). In one or more embodiments, the coordinates of the region of interest in the image are the Cartesian coordinates of the pixels where the vertices of the region of interest are located, with one of the vertices of the region of interest (e.g., the top left or the bottom left) having the (x,y) coordinates of (0,0). Alternatively, other coordinate systems can be used, or no vertex may have a coordinate of (0,0).

Coordinates of a rectangular region are also identified (act 704). In one or more embodiments, the coordinates of the rectangular region are the Cartesian coordinates of the vertices of the rectangular region. The vertices of the rectangular region are determined based on the coordinates of the region of interest in the image, as discussed in more detail below.

Figure 8:
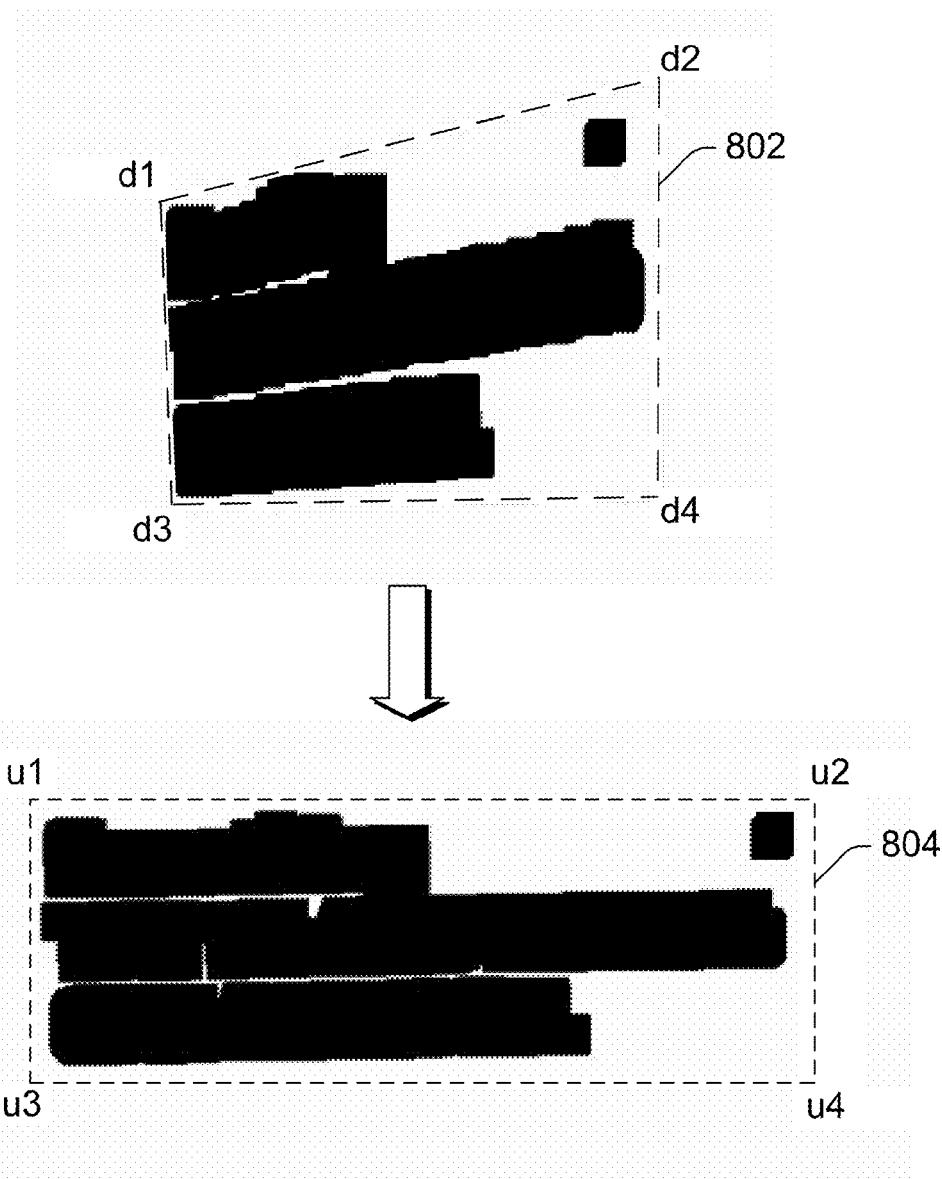
FIG. 8 illustrates example regions in accordance with one or more embodiments.

FIG. 8 illustrates example regions in accordance with one or more embodiments 800. A region of interest 802 of an image is shown, and is a non-rectangular region. The region of interest 802 can be, for example, the region of interest 602 of FIG. 6. A rectangular region 804 is also shown. The region of interest 802 and the rectangular region 804 are related by a homography, which is a 3×3 projective transformation matrix. The homography relates the region of interest 802 and the rectangular region 804 according to the following:

$$u_i = H * d_i \qquad (1)$$

where $u_i$ refers to the coordinates of the vertices of the rectangular region 804, H refers to the homography, and $d_i$ refers to the coordinates of the vertices of the region of interest 802 (top left, top right, bottom left, and bottom right vertices).

The coordinates of the rectangular region are identified in act 704 of FIG. 7 as follows (referring also to FIG. 8). The coordinate $u_1$ is initialized to be (0,0). The coordinate $u_2$ is set to be (w,0), where w is the smaller of the distance between $d_3$ and $d_4$, and the distance between $d_1$ and $d_2$. The coordinate $u_3$ is set to be (0,h), where h is the smaller of the distance between $d_1$ and $d_3$, and the distance between $d_2$ and $d_4$. The coordinate $u_4$ is set to be (w,h).

The homography is generated based on the coordinates of the region of interest in the image and the coordinates of the rectangular region (act 706). Given the values of $u_i$ and $d_i$, the homography H can be readily determined by forming a linear system of equations using equation (1) and solving the linear system of equations (e.g., using singular value decomposition).

The generated homography is applied to the pixels in the region of interest in the image to generate the pixels for the rectangular region (act 708). The homography is applied to the value of each pixel in the region of interest in the image, resulting in the transformation of the values in the pixels in the region of interest to the pixels in the rectangular region. It should be noted that the values of the pixels in the region of interest in act 708 are the values of the original image (e.g., the image 300 of FIG. 3) rather than the values in other versions of the image (e.g., the dilated or thresholded versions).

Font Detection

The font detection module 116 represents functionality to detect one or more fonts of the text in the region of interest. Different characters of the text in the region of interest can be of different fonts (also referred to as having different fonts). The font of a character refers to the font used to display the character. The font detection module 116 identifies one or more fonts that are the same as, or similar to, the font of the text in the region of interest. The font detection module 116 operates on the transformed region of interest (generated in act 708 of FIG. 7).

Figure 9:
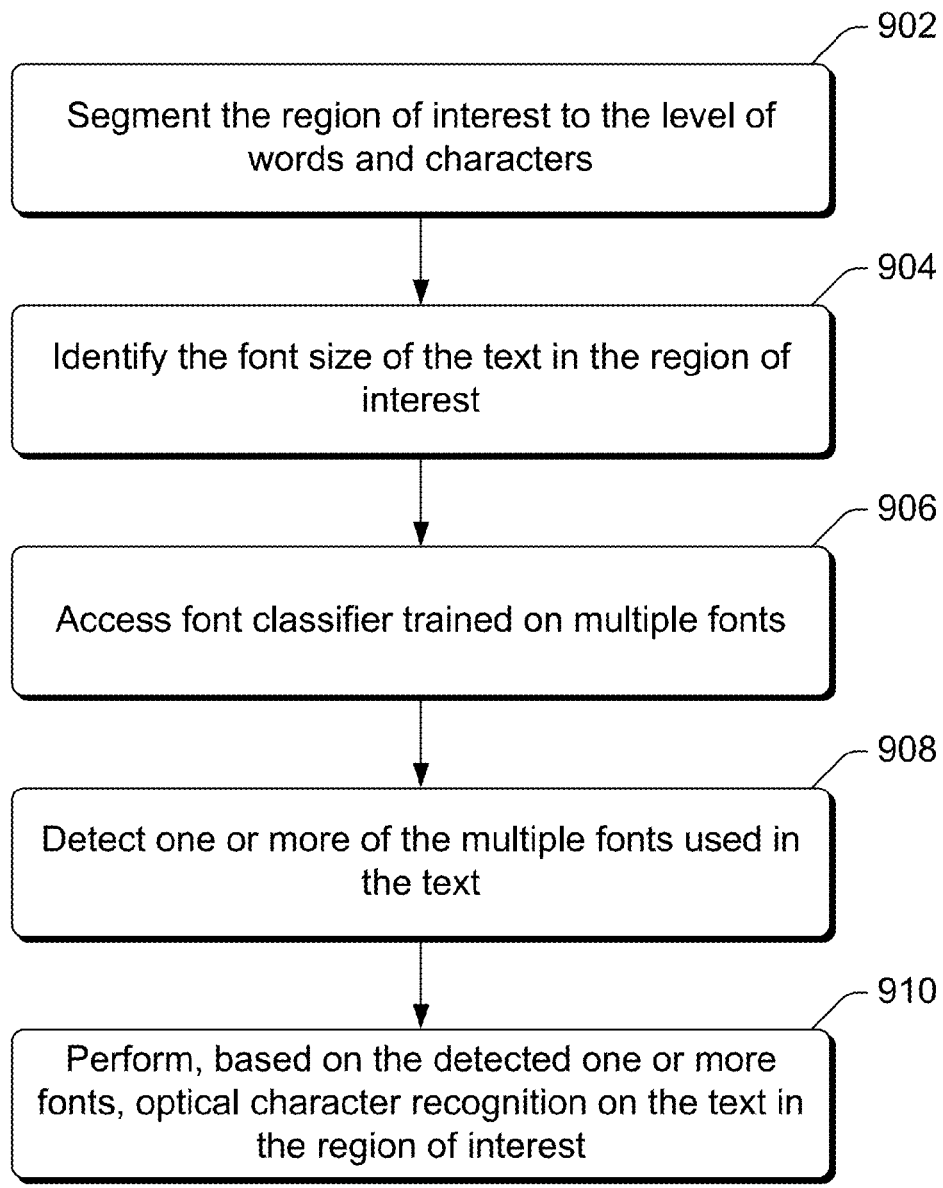
FIG. 9 is a flowchart illustrating an example process for performing font detection and using detected fonts in accordance with one or more embodiments.

FIG. 9 is a flowchart illustrating an example process 900 for performing font detection and using detected fonts in accordance with one or more embodiments. Process 900 is carried out by a font detection module of a device, such as the font detection module 116 of FIG. 1, and can be implemented in software, firmware, hardware, or combinations thereof. Process 900 is shown as a set of acts and is not limited to the order shown for performing the operations of the various acts. Process 900 is an example process for performing font detection and using detected fonts; additional discussions of performing font detection and using detected fonts are included herein with reference to different figures.

In process 900, the region of interest is segmented to the level of words and characters (act 902). The region of interest can be segmented into characters by identifying each collection of one or more contiguous lines (which form a character) that is separated by a space (e.g., of at least one pixel) from other collections of one or more contiguous lines. The region of interest can be segmented into words in a similar manner as the generation of the dilated version of the image discussed above, although fewer times than discussed above in generating the dilated version of the image. For example, the dilation operation is applied one or more times (e.g., two to three times), being repeatedly applied until multiple expanded characters run together, at which point each collection of one or more characters that run together form a word in the text.

The font size of the text in the region of interest is identified (act 904). The font size for the text can be readily determined given the average number of characters in the lines of text and the number of pixels in each line of text. In one or more embodiments, the font size for the text is determined as the average character height (in number of pixels) of all of the individual characters in the distortion corrected image (e.g., transformed region of interest generated in act 708 of FIG. 7). The characters in the same text block are considered to compute the average character height, so a different font size can be identified for each different text block. Alternatively, the characters in different text blocks can be considered to compute the average character height.

Additionally, as a verification measure the standard deviation in the height of all the characters in a text block is determined. If the standard deviation does not satisfy (e.g., is equal to, is equal to or greater than) a particular threshold (e.g., 1 or 2), multiple font sizes are determined to be present within the text block. In response, the number of characters in the text block are reduced. The number of characters in the text block can be reduced in different manners, such as by dividing the text block substantially in half (so the same number of characters are in each half, or the difference in the number of characters in each half is below a threshold value, such as 1 or 2) to generate two text blocks. For each text block, the number of characters in the text block continues to be reduced until the standard deviation satisfies the particular threshold.

A font classifier that has been trained on multiple fonts is accessed (act 906). The font classifier (e.g., included as part of the font detection module) is trained on each font that the font detection module desires to support. In one or more embodiments, the optical character recognizer is trained using multi class linear discriminant analysis (LDA). Using LDA, a set of multiple D-dimensional samples (the value D referring to the number of different characters in a font, such as 62 alphanumeric characters) for each different class is accessed. Each different class is a different font supported by the font detection module. Using LDA and the sets of samples, a line is identified such that the projection of the samples onto the line maximizes the separation of scalars (maximizes the separation of the projected samples on the line).

Figure 10:
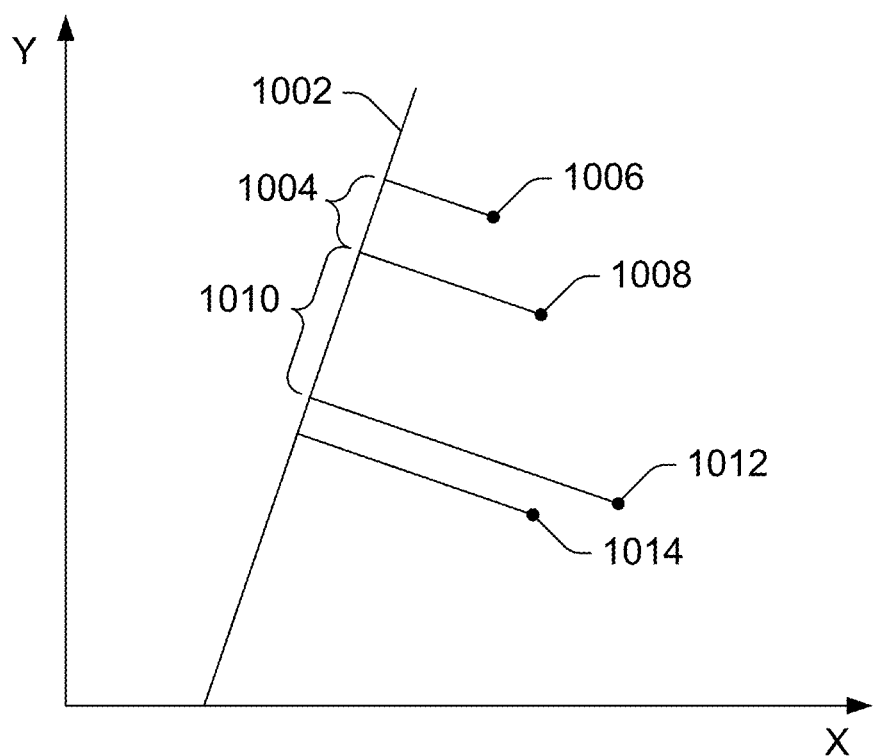
FIG. 10 illustrates an example of projecting samples onto a line in accordance with one or more embodiments.

FIG. 10 illustrates an example of projecting samples onto a line in accordance with one or more embodiments. A two-dimensional graph 1000 is illustrated. The line 1002 is generated using linear discriminant analysis so that the separation of projections onto the line 1002 of the samples from different fonts is maximized. These distances are, for example, the distance 1004 between the projection of the samples of the font represented by point 1006 and the samples of the font represented by point 1008, the distance 1010 between the projection of the samples of the font represented by point 1008 and the samples of the font represented by point 1012, and so forth.

Returning to FIG. 9, the font of the text in the region of interest is detected (act 908) by the font classifier. Different characters in the text in the region of interest can have different fonts, and the font of each different character can be detected. The font of a character is detected as the one of the multiple fonts that the optical character recognizer is trained on that is closest to the font of the character. How close the font of a character is to another font is determined by projecting the font of the character onto the line obtained in act 906 using linear discriminant analysis—the other font (which is one of the different fonts supported by the font detection module) that projects to a location on the line that is closest to the location that the font of the character projects to is the detected font of the character.

For example, referring again to FIG. 10, assume that a character has a font 1014. The font 1014 projects onto the line 1002 closest to (the smallest distance to) the projection of the font 1012 onto the line 1002. Thus, the font of the character is detected as the font 1012.

Returning to FIG. 9, given the font of the characters in the text in the region of interest, optical character recognition is performed by the optical character recognizer based on the detected fonts (act 910). The optical character recognizer can be included as part of the font detection module or alternatively part of another component or module of the device. The optical character recognizer can recognized characters in the text in any of a variety of public and or proprietary manners. However, because the font of a character being recognized is known, the manner in which each character is recognized is performed based on the font of the character.

In one or more embodiments, the optical character recognition is performed in act 910 as follows. For each supported font, a pre-trained dataset is used and all the segmented text characters are run against that trained dataset. To train each character (for each font), a Linear Discriminant Analysis based classifier is used so that features can be extracted which preserves class separability. This helps the recognition algorithm to distinguish between different characters efficiently and more accurately. The recognition algorithm uses 62 dimensions of alphanumeric characters each containing N samples (x1 . . . xn) of each character. Each sample is assigned to a different class C1 . . . Cn. Thus, for example, different variations of say character "A" belong to a class C1 and similarly different variations of say character "B" belong to class C2. A scalar y is obtained by projecting the samples x onto a line y=wTx (where wT is w Transpose). Of all possible lines it will generate, the one line that maximizes class separability is chosen. When a new character (after segmentation) is sent to this OCR, it will project this into the scalar line calculated above, and a class with which its distance is minimum after projection is chosen as a result.

Text Editing

The text editing module 118 represents functionality to edit text in the region of interest. This editing can be deleting text, adding text, replacing text, combinations thereof, and so forth.

Figure 11:
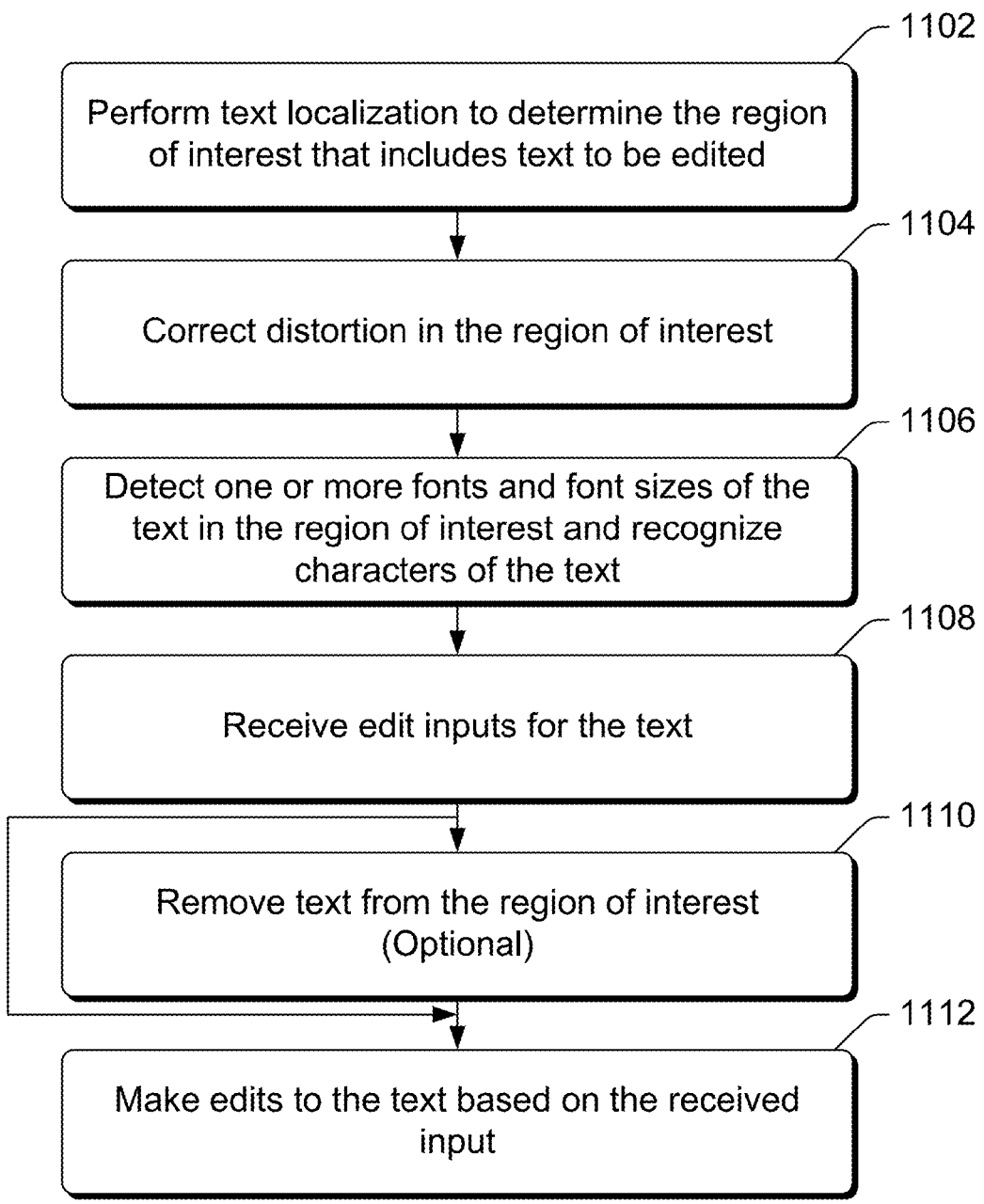
FIG. 11 is a flowchart illustrating an example process for performing text editing in accordance with one or more embodiments.

FIG. 11 is a flowchart illustrating an example process 1100 for performing text editing in accordance with one or more embodiments. Process 1100 is carried out by a text editing module of a device, such as the text editing module 118 of FIG. 1, and can be implemented in software, firmware, hardware, or combinations thereof. Process 1100 is shown as a set of acts and is not limited to the order shown for performing the operations of the various acts. Process 1100 is an example process for performing text editing; additional discussions of performing text editing are included herein with reference to different figures.

In process 1100, text localization is performed to determine the region of interest that includes text to be edited (act 1102). This text localization is performed by a text block localization module as discussed above.

Distortion in the region of interest is also corrected (act 1104). This correction is performed by a distortion correction module as discussed above.

One or more fonts of the text in the region of interest, and the font sizes, are also detected and characters in the text are optionally recognized (act 1106). This detection is performed by a font detection module as discussed above, and the characters can be recognized using an optical character recognizer as discussed above. It should be noted that in some situations the characters in the text need not be recognized. For example, if the edit input discussed below indicates to replace all of the text in the region of interest, then the characters in the text in the region of interest need not be recognized.

Edit inputs for the text in the region of interest are received (act 1108). These edit inputs can be received as user inputs, or alternatively can be received from other components, modules, devices, and so forth. The text in the region of interest can be edited in any of a variety of different manners. For example, all of the text can be deleted, all of the text can be replaced with new text, some (but less than all) of the text can be deleted, some (but less than all) of the text can be replaced with new text, new text can be added (even if no text is deleted or replaced), and so forth.

Text is optionally removed from the region of interest (act 1110). Whether text is removed from the region of interest is determined at least in part on the editing to be performed. For example, if text is to be deleted or replaced, then text is removed from the region of interest in act 1110. However, if text is to be added (without deleting or replacing text), then no text need be removed from the region of interest in act 1110.

In one or more embodiments, in situations in which text is removed from the region of interest the text editing module uses a content aware fill process to remove at least some of the text. The content aware fill process fills in the locations where the removed text was located with the same content as surrounded the character, making the location where the removed text was located appear as if there never was text at that location. Effectively, the content aware fill process replaces the locations where the removed text was located with the same appearance as the background on which the removed text is located. The content aware fill process can be performed using any of a variety of public or proprietary techniques.

In one or more embodiments, text is removed from the region of interest in act 1110 as follows. The segmentation information obtained as discussed above is used in conduction with a content aware fill algorithm. The adaptive thresholded and distortion corrected text block region are provided as the 'hole mask'—the black pixels signify the image region that are to be removed. The rest of the image forms the 'hint mask'—the region from which the suitable portions are picked up to fill the holes.

Edits are made to the text based on the received input (act 1112). The received input is edit inputs received in act 1108. If a character is replaced by a new character (e.g., the new character is to be situated in substantially the same location as the replaced character) then the new character is added in the same font and font size as the replaced character had (as detected in act 1106). If new characters are added, or all text is replaced, then the font of the new characters is one or more of the fonts of the characters that were originally in the region of interest. For example, an indication of the fonts originally used in the text of the region of interest can be presented to the user, and a user selection of one or more of those fonts can be received, and the selected one or more fonts used for the new text.

Additionally, if new characters are added to the region of interest, the new characters are transformed using the same homography as was determined to correct distortion in the region of interest in act 1104. For the pixels in the rectangular region where new text is added, the homography H determined above is used to transform the location of those pixels in the rectangular region to the pixels in the region of interest in the image based on equation (1) discussed above.

Example System and Device

Figure 12:
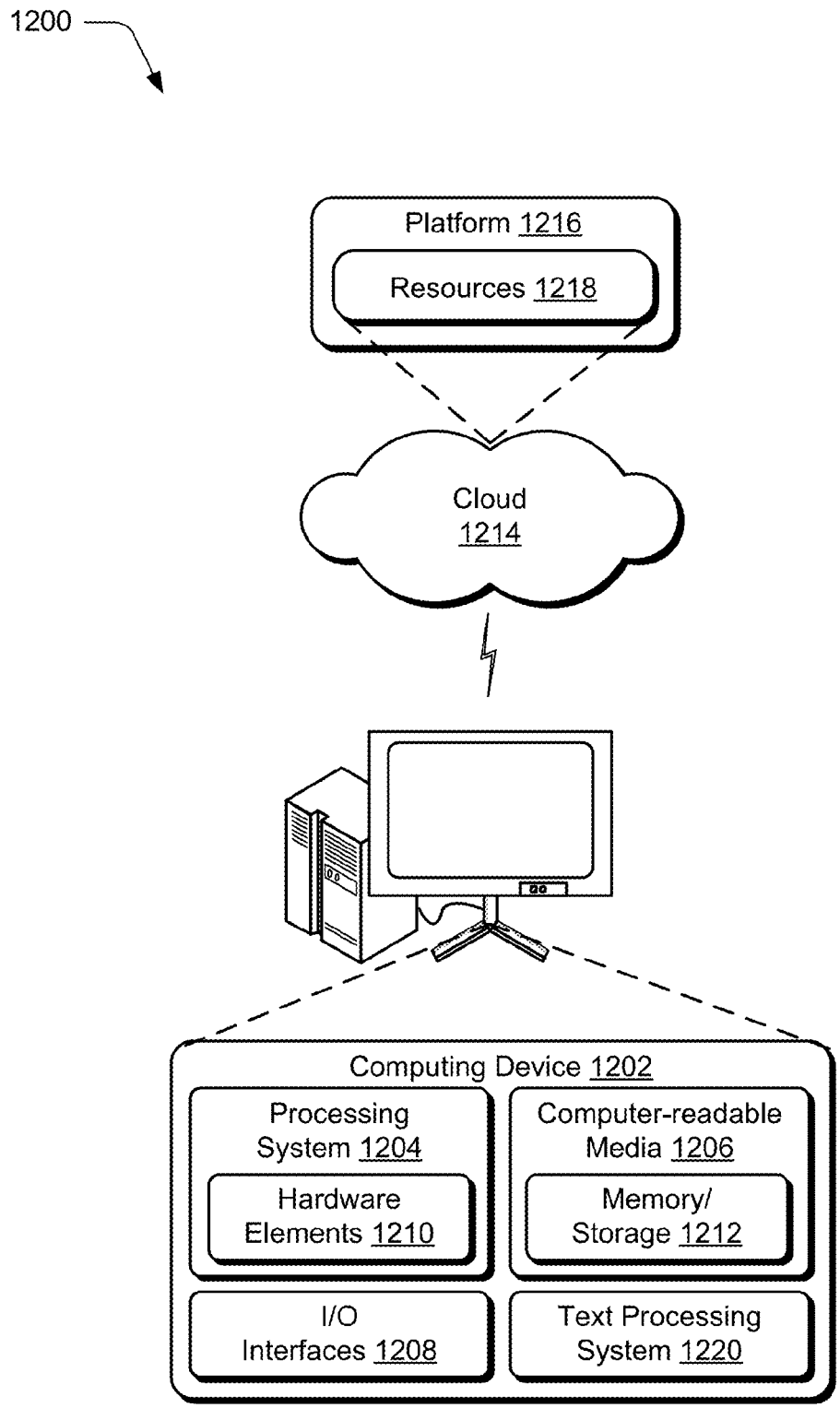
FIG. 12 illustrates an example system that includes an example computing device that is representative of one or more computing systems and/or devices that may implement the various techniques described herein.

FIG. 12 illustrates an example system generally at 1200 that includes an example computing device 1202 that is representative of one or more computing systems and/or devices that may implement the various techniques described herein. This is illustrated through inclusion of the text processing system 1220, which can include any one or combination of the text block localization module 112, the distortion correction module 114, the font detection module 116, and the text editing module 118 as described above. The computing device 1202 may be, for example, a server of a service provider, a device associated with a client (e.g., a client device), an on-chip system, and/or any other suitable computing device or computing system.

The example computing device 1202 illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of recognizing text in an image by at least one computing device, the method comprising:
   identifying, by the at least one computing device, a region of interest in the image including text, the identifying including:
   generating a thresholded version of the image; and
   expanding boundaries of individual characters to form a plurality of text blocks in the thresholded image, at least one text block of the plurality of text blocks including a plurality of said individual characters;
   determining, by the at least one computing device, a transformation matrix to correct distortion of the region of interest in the image;
   transforming, by the at least one computing device, pixels in the region of interest to correct the distortion;
   recognizing, by the at least one computing device, characters of the text from the transformed pixels in the region of interest; and
   outputting, by the at least one computing device, a result including the recognized characters of text.

2. The method of claim 1, further comprising receiving an edit input and editing the text in the region of interest based on the edit input.

3. The method of claim 2, further comprising:
   receiving, as part of the edit input, new text;
   transforming the new text using the transformation matrix; and
   replacing at least some of the text in the region of interest with the transformed new text.

4. The method of claim 1, the transformation matrix comprises a homography generated based on vertices of the region of interest and vertices of the substantially rectangular region.

5. The method of claim 1, the substantially rectangular region comprising a quadrilateral region having opposite sides that are within a threshold number of degrees of being parallel.

6. The method of claim 1, wherein the thresholded image is a binary version of the image in which pixels of the thresholded image are set to one of two color options.

7. The method of claim 6, wherein generating of the dilated version is repeated until the plurality of text blocks are formed through expanding the boundaries of the individual characters.

8. The method of claim 1, wherein the identifying further comprises:
   defining a test region within the image that includes the plurality of text blocks; and
   discarding at least one of the plurality of text blocks due to size to form the region of interest from the defined test region.

9. A method of editing text in an image by at least one computing device, the method comprising:
   identifying, by the at least one computing device, a region of interest in an image, the region of interest including text;
   transforming, by the at least one computing device, the region of interest to correct distortion based at least in part on a homography;

detecting, by the at least one computing device, a respective one of the multiple fonts used within the plurality of segments using a font classifier;

using, by the at least one computing device, an optical character recognizer to recognize the character based on the detected font;

receiving, by the at least one computing device, a user input to replace the character with another character;

removing, by the at least one computing device, the character from the image based on a content aware fill process;

adding, by the at least one computing device, the other character to the image in the detected font based at least in part on the homography; and outputting, by the at least one computing device, a result of the adding of the other character to the image.

10. The method of claim 9, the font classifier having been trained on the multiple fonts using linear discriminant analysis.

11. The method of claim 9, the detecting comprising using linear discriminant analysis to identify one of the multiple fonts that is closest to a font of the character.

12. The method of claim 9, the detecting comprising detecting the font of each of multiple characters in the text.

13. A computing device comprising:
a processing system including one or more processors; and
one or more computer-readable storage media having stored thereon multiple instructions that, when executed by the processing system, cause the processing system to perform acts comprising:
identifying a region of interest in an image, the region of interest including text;
transforming the region of interest to correct distortion based at least in part on a homography;
detecting a respective one of the multiple fonts used within the transformed region of interest based on a font classifier;
recognizing a character in the detected font based on an optical character recognizer;
receiving a user input to replace the character with another character;
removing the character from the image based on a content aware fill process;
adding the other character to the image in the detected font based at least in part on the homography; and
outputting, by the at least one computing device, a result of the adding of the other character to the image.

14. The computing device of claim 13, the acts further comprising:
determining a transformation matrix to correct the distortion of the region of interest in the image;
transforming the pixels in the region of interest to a substantially rectangular region; and
recognizing, from the substantially rectangular region, characters of the text.

15. The computing device of claim 14, the transformation matrix comprising a homography that is a 3×3 projective transformation matrix.

16. The computing device of claim 15, wherein values $u_i$ refer to the coordinates of the vertices of the substantially rectangular region, values $d_i$ refer to the coordinates of the vertices of the region of interest, a value H refers to the homography, and the homography is determined by solving an equation $u_i = H * d_i$.

17. The computing device of claim 13, the font classifier having been trained on the multiple fonts using linear discriminant analysis.

18. The computing device of claim 13, wherein the content aware fill process is configured to remove the character from the text by replacing locations where the character was present with a same appearance as a background on which the character was present.

19. The computing device of claim 13, wherein the adding of the other character to the image is based at least in part on the homography is based on a transformation matrix generated to correct the distortion of the region of interest in the image.

20. The computing device of claim 13, the distortion in the region of interest being a surface in the image on which the text is situated being at some non-zero angle relative to an image capture plane that captured the image.

* * * * *